No. 845,080. PATENTED FEB. 26, 1907.
E. C. HARDEGEN & H. H. KENNEDY.
MOTOR VEHICLE.
APPLICATION FILED AUG. 12, 1905.

Attest:
Edgeworth Greene
A. W. Jesbera

Inventors
Emil C. Hardegen
and Harold H. Kennedy
by Redding, Kiddle & Greeley
Attys.

UNITED STATES PATENT OFFICE.

EMIL C. HARDEGEN AND HAROLD H. KENNEDY, OF INDIANAPOLIS, INDIANA, ASSIGNORS TO POPE MANUFACTURING COMPANY, OF JERSEY CITY, NEW JERSEY, A CORPORATION OF NEW JERSEY.

MOTOR-VEHICLE.

No. 845,080.     Specification of Letters Patent.     Patented Feb. 26, 1907.

Application filed August 12, 1905. Serial No. 273,877.

*To all whom it may concern:*

Be it known that we, EMIL C. HARDEGEN and HAROLD H. KENNEDY, both citizens of the United States, residing in the city of Indianapolis, county of Marion, in the State of Indiana, have invented certain new and useful Improvements in Motor-Vehicles, of which the following is a specification, reference being had to the accompanying drawings, forming a part hereof.

This invention has relation to the means for maintaining the driving-axle of a motor-vehicle and the parts carried thereby and the motor in proper relation to each other and to the vehicle body or frame by which they are supported, and in accordance therewith a distance-rod is provided between the axle and some fixed part of the frame or body of the vehicle, preferably the battery-box if it be an electrically-driven vehicle, and another distance-rod is interposed between the axle and the motor shaft or casing, the motor being preferably so suspended from the vehicle frame or body as to be free to yield to a limited extent with the axle in the relative movements of the latter and provision being also preferably made whereby the axle also may be free to move to a limited extent with respect to the vehicle frame or body.

The invention will be more fully explained hereinafter with reference to the accompanying drawings, which is illustrated as embodied in a convenient and practical form, and in which—

Figure 1:
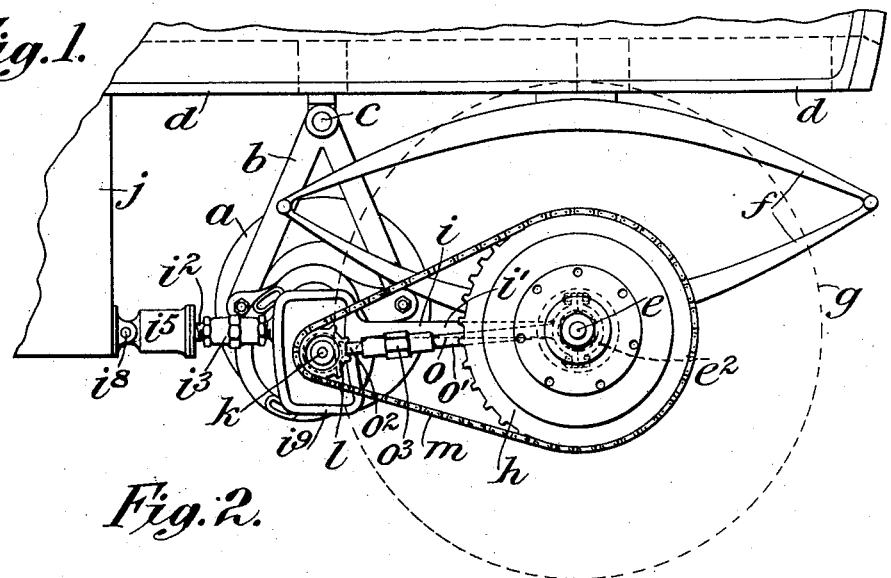
Figure 2:
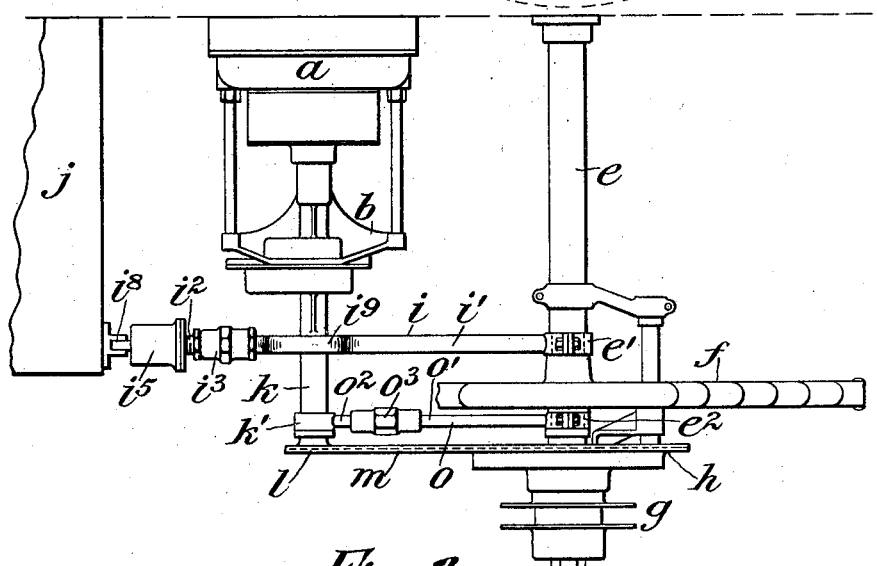
Figure 3:
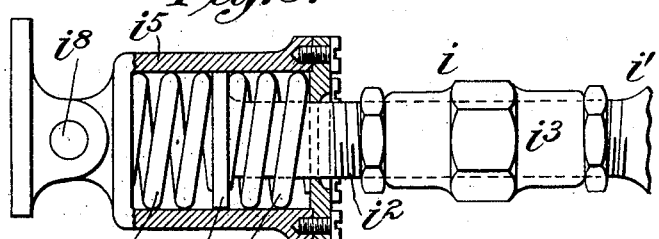

Figure 1 is a view in side elevation of so much of a motor-vehicle as is necessary to illustrate the application of the invention thereto. Fig. 2 is a top plan view of the parts shown in Fig. 1, the body of the vehicle and the motor-suspension links being removed. Fig. 3 is a detail view, partly in section, illustrating particularly the devices for permitting limited movement of the driving-axle with respect to the vehicle frame or body.

In the embodiment of the invention illustrated in the drawings the motor $a$ is shown as carried by a suspender-frame $b$, which in this particular instance is pivotally secured, as at $c$, to the body-frame $d$ of the vehicle. The rear or driving axle $e$ is also shown as suspended from the body-frame $d$ by elliptical springs $f$, as usual in vehicles of this description. The axle $e$ supports the driving-wheels, one of which is indicated in dotted lines at $g$ and is represented as provided with a driving-gear $h$. A distance-rod $i$ is properly secured at one end to the axle $e$, as by a collar $e'$, and at the other end is secured to a fixed point carried by the frame either directly or, as shown, indirectly by attachment to the battery-box $j$. The distance-rod is so constructed as to maintain the axle in proper relative position and is yet somewhat yielding or elastic in order to permit the necessary relative movement of the axle with respect to the body-frame. As shown in the drawings, the link or bar comprises two parts or members $i'$ and $i^2$, united by a turnbuckle $i^3$, so that the length of the rod can be readily adjusted. The part or member $i^2$ of the rod carries a flange $i^4$ within a spring-box $i^5$, springs $i^6$ and $i^7$ being interposed between the flange or head $i^4$ and the respective ends of the spring-box, and said spring-box is connected to the battery-box by a swivel-joint, as at $i^8$. Thus the axle is permitted to have free vertical movement with respect to the body-frame, except so far as the same is limited by the springs $f$, is held in proper relative position in a fore-and-aft direction, although not rigidly, since the springs $i^6$ and $i^7$ cushion such fore-and-aft movement and can have this position quickly adjusted by the turnbuckle $i^3$, which also permits the parts to be assembled or disassembled readily.

In the structure represented in the drawings the motor-shaft $k$ carries a small sprocket $l$, from which power is transmitted by a chain $m$ to a large sprocket or gear $h$ on the corresponding driving wheel or axle. The motor, as before stated, is movably suspended from the frame $d$ of the vehicle, and in order that the proper relation shall be maintained between the sprocket $l$, the chain $m$, and the gear $h$ a distance-rod $o$ is interposed between the axle and the motor frame or shaft. This distance-rod also comprises two parts $o'$ and $o^2$, united by a turnbuckle $o^3$ to permit easy adjustment and assembling or disassembling. This distance-rod is preferably placed as close as convenient to the end of the shaft $k$ and to the line of the chain $m$, the collar $e^2$ on the axle $e$ and the collar $k'$ on the shaft $k$ being shown in this instance as outside of the spring $f$. The two distance-rods $i$ and $o$ are preferably nearly or substantially in the same transverse plane, so that the line of the motor-shaft $k$ intersects the line of the distance-rod $i$. In order that this relation of the parts may be permitted and also that excessive relative movement of the motor-shaft may be prevented, the distance-rod $i$, or the member $i'$ thereof, is formed with a frame $i^9$, which surrounds the shaft $k$, and is so shaped, its front and rear members being preferably curved upon the axis of the axle $e$ as a center, so that such frame may afford a bearing for the shaft $k$, whereby the relative movement is restrained but is not prevented wholly.

It will now be understood that while the motor and the axle are flexibly supported with respect to the frame of the vehicle nevertheless the proper driving relation between the motor and the axle is at all times maintained and excessive relative movement of the axle and motor with respect to the frame is prevented.

It will be understood that the details of construction and arrangement can be varied as required to suit different conditions of use without departing from the spirit of the invention.

We claim as our invention—

1. The combination with a vehicle-frame, of an axle flexibly supported with relation thereto, and a longitudinally-yielding distance-rod secured to said axle at one end and to a relatively fixed point at the other end to permit free relative movement of the axle in a substantially vertical plane while maintaining said axle in proper relative position, substantially as described.

2. The combination with a vehicle-frame, of an axle flexibly supported with relation thereto, and a distance-rod secured to said axle at one end and to a relatively fixed point at the other end and having a longitudinally-yielding cushion interposed between its ends, said distance-rod permitting free relative movement of the axle in a substantially vertical plane while maintaining said axle in proper relative position, substantially as described.

3. The combination with a vehicle-frame, of an axle flexibly supported with respect thereto, and a distance-rod secured to said axle at one end and pivoted to a relatively fixed point at the other end and having a longitudinally-yielding cushion between its ends, said distance-rod permitting free relative movement of the axle in a substantially vertical plane while maintaining said axle in proper relative position, substantially as described.

4. The combination with a vehicle-frame, of an axle flexibly supported with relation thereto, and a distance-rod secured to said axle at one end and to a relatively fixed point at the other end and comprising a spring-box and springs between its ends, said distance-rod permitting free relative movement of the axle in a substantially vertical plane while maintaining said axle in proper relative position, substantially as described.

5. The combination with a vehicle-frame, of an axle flexibly supported with relation thereto, a motor also flexibly supported with relation to the frame, a distance-rod secured to said axle at one end and to a relatively fixed point at the other end, and a distance-rod secured at one end to said axle and to the motor at the other end, substantially as described.

6. The combination with a vehicle-frame, of an axle flexibly supported with relation thereto, a motor also flexibly supported with relation to the frame, a distance-rod secured to the axle at one end and to a relatively fixed point at the other end, and a distance-rod secured at one end to said axle and to the motor at the other end, one of said distance-rods having a longitudinally-yielding cushion between its ends, substantially as described.

7. The combination with a vehicle-frame, of an axle flexibly supported with relation thereto, a driving-wheel mounted on said axle, a motor movably supported with relation to the frame, a distance-rod secured to said axle at one end and to a relatively fixed point at the other end, and a distance-rod secured at one end to said axle and to the motor at the other end, the first-named distance-rod having a frame surrounding the motor-shaft, substantially as described.

This specification signed and witnessed this 3d day of August, 1905.

EMIL C. HARDEGEN.
HAROLD H. KENNEDY.

In presence of—
D. V. CLEM.
R. W JONES.